United States Patent [19]

Shirakawa et al.

[11] Patent Number: 4,888,728
[45] Date of Patent: Dec. 19, 1989

[54] MULTIPOINT LINK DATA-TRANSMISSION CONTROL SYSTEM

[75] Inventors: Masakazu Shirakawa, Tokyo; Hiroaki Yamashita; Toshio Nishida, both of Yokohama, all of Japan

[73] Assignee: Kabushiki Kaisha Toshiba, Kawasaki, Japan

[21] Appl. No.: 31,576

[22] Filed: Mar. 30, 1987

[30] Foreign Application Priority Data

Mar. 29, 1986 [JP] Japan .................. 61-72130

[51] Int. Cl.⁴ .................. G06F 13/00; G06F 11/00
[52] U.S. Cl. .................. 364/900; 371/14; 364/942.4; 364/945.4
[58] Field of Search .................. 340/825.06, 325.07, 340/825.08, 825.16; 870/85, 90; 871/7, 11, 14; 364/200 MS File, 900 MS File

[56] References Cited

U.S. PATENT DOCUMENTS

| | | | |
|---|---|---|---|
| 3,581,075 | 5/1971 | Mattsson | 371/14 |
| 3,997,879 | 12/1976 | Markley et al. | 371/11 |
| 4,100,597 | 7/1978 | Fleming et al. | 364/900 |
| 4,377,000 | 3/1983 | Staab | 371/11 |
| 4,454,509 | 6/1984 | Buennagel et al. | 340/825.06 |
| 4,543,627 | 10/1985 | Schwab | 364/200 |
| 4,627,054 | 12/1986 | Cooper et al. | 371/11 |
| 4,629,919 | 9/1987 | West, Jr. | 340/825.08 |
| 4,644,539 | 2/1987 | Sato | 371/11 |
| 4,701,910 | 10/1987 | Ulug | 370/85 |
| 4,736,409 | 4/1988 | Hasegawa et al. | |

Primary Examiner—Gareth D. Shaw
Assistant Examiner—Rebecca L. Rudolph
Attorney, Agent, or Firm—Oblon, Spivak, McClelland, Maier & Neustadt

[57] ABSTRACT

According to a multipoint link data-transmission control system, a master transmission device delivers message data via a bidirectional transmission path to a plurality of slave transmission devices, the data containing a control field for designating control data for setting or resetting a flag. The transmitting of data from the slave transmission device to the master transmission device is allowed when the flag is set, and is inhibited when the flat is reset. Where the transmitting of data from a faulty slave transmission device is to be inhibited, the master transmission device transmits the data to the faculty slave transmission device, by designating flag reset data to the control field of the message data. As a result, a transmission-enable signal, which is delivered in synchronization with a transmission-timing clock signal, is reset, thereby stopping the transmitting of data from the slave transmission device to the master transmission device.

6 Claims, 4 Drawing Sheets

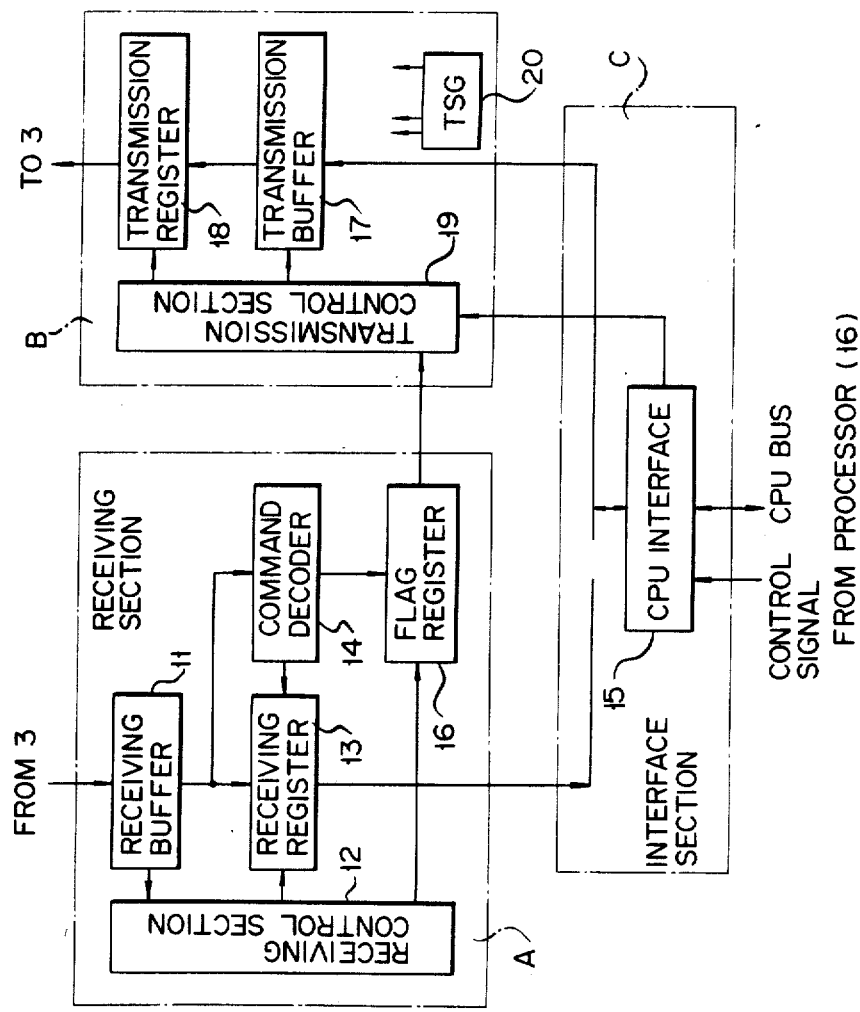

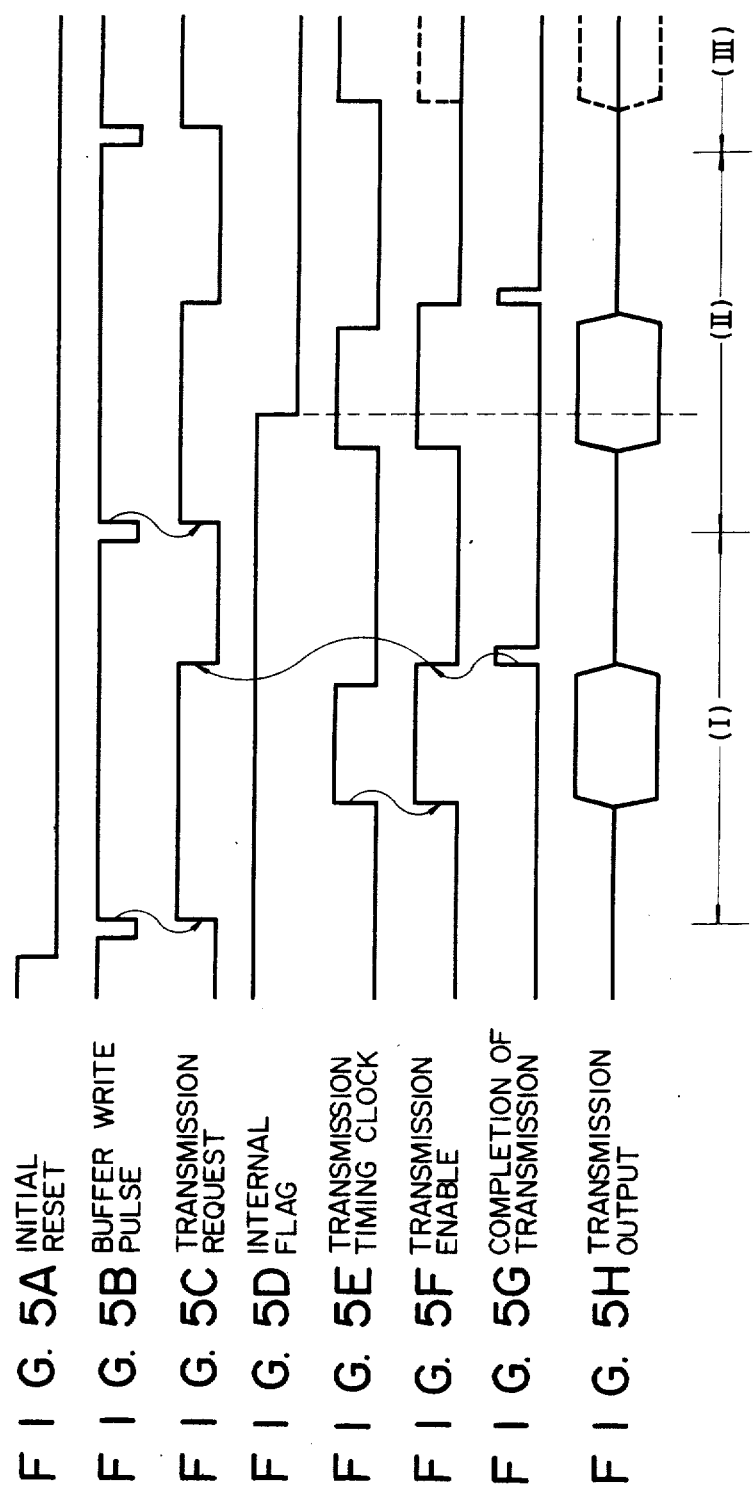
FIG. 5A INITIAL RESET
FIG. 5B BUFFER WRITE PULSE
FIG. 5C TRANSMISSION REQUEST
FIG. 5D INTERNAL FLAG
FIG. 5E TRANSMISSION TIMING CLOCK
FIG. 5F TRANSMISSION ENABLE
FIG. 5G COMPLETION OF TRANSMISSION
FIG. 5H TRANSMISSION OUTPUT

MULTIPOINT LINK DATA-TRANSMISSION CONTROL SYSTEM

BACKGROUND OF THE INVENTION

This invention relates to a multipoint link data-transmission control system.

Generally, a multipoint link data-transmission system is known which controls the transmission of data among data-transmission devices connected, through a bidirectional transmission path, in a one-to-n fashion.

As is shown in FIG. 1, for example, a multiprocessor system has been developed which, through use of a plurality of processors $1a$, $1b$, ..., $1n$, hierarchically distributes their processing functions, as demanded by an information-processing system, as well as their loads, so as to enhance the overall processing capability.

In the multiprocessor system shown in FIG. 1, high-level processor $1a$ is connected to master transmission device $2a$, and low-level processors $1b$, ..., $1n$ are connected to slave transmission devices $2b$, ..., $2n$, respectively. Master transmission device $2a$ is connected via a bidirectional transmission path to slave transmission devices $2b$, ..., $2n$ of low-level processors $1b$, ..., $1n$.

When data is transmitted from master transmission device $2a$ to slave transmission devices $2b$, ..., $2n$, a header containing a destination address is attached to the transmission data. On the other hand, when data is transmitted from slave transmission devices $2b$, ..., $2n$ to master transmission device $2a$ or to other transmission devices, a header containing a source address is attached to the transmission data.

Of this type of system, in which data is transmitted from a master transmission device to a respective slave transmission device, three types are known.

The first system is a type in which the master transmission device simultaneously transmits data to the respective slave transmission devices, and, when necessary, this master device is able to inhibit the transmitting of data from all the slave transmission devices.

The second system is a type which transmits the same data message to a respective group into which slave transmission devices having the same processing function have been assembled. This system effectively controls the transmitting of data by the slave transmission devices performing the same processing.

The third system is a type which transmits data to a desired slave transmission device, by designating the corresponding destination address thereof.

When data is to be transmitted from the respective slave transmission device to the master transmission device, the master transmission device receives data, at a predetermined time interval, from the respective slave transmission device, on the basis of a time slot allotted thereto. Another transmission system allows one time slot to be shared among a plurality of slave transmission devices, through the slave transmission device transmitting data to the master transmission device, with a corresponding identification code attached to the message data. A practical application of such a multiprocessor is in, for example, an electronic telephone exchange system.

In such a system, if a fault develops in any of slave transmission devices $2b$, ..., $2n$, and particularly in low-level processors $1b$, ..., $1n$, master transmission device $2a$ (upper-level processor $1a$) operates to prevent the normally-operating slave transmission devices (slave processors) from being disabled, by receiving data from the faulty slave transmission device and then discarding this data.

In this way, the conventional system provides a bar to efficient data-transmission control, since it is pointless to perform data communication with the faulty slave transmission device (slave processor).

SUMMARY OF THE INVENTION

It is accordingly the object of the present invention to provide a multipoint link data-transmission control system which can inhibit erroneous data from being transmitted from a faulty slave transmission device (slave processor), by controlling the slave transmission device by a master transmission device, and by inhibiting the transmitting of data from the master transmission device to all the slave transmission devices, without the loss of any data.

In order to achieve the aforementioned object of the present invention, a multipoint link data-transmission control system is provided which includes a master transmission device to which a master processor is connected, and a plurality of slave transmission devices connected via a bidirectional transmission path to the master transmission device, and to which a corresponding slave processor is connected, the slave transmission device comprising:

a receiving section including:

a receiving buffer for receiving, from the master transmission device, message data containing a control field for designating control data to the slave transmission device;

a decoder for decoding the control field of the data message from the receiving buffer; and a flag register set or reset in response to a decoded output from the decoder, and a transmission section including:

a timing-signal generator for generating a transmission-timing clock signal to allow the data to be transmitted in synchronization therewith:

a first latch, for holding a transmission-request signal from the slave processor;

a gate for passing flag data which is set to the flag register only when a transmission-request signal is output from the first latch; and a second latch, for holding the flag data from the gate, in synchronization with the transmission-timing clock signal, and for outputting a transmission-enable signal or a transmission-disable signal in accordance with the contents of the flag data.

In the multipoint link data-transmission control system of the present invention, the master transmission device sets or resets a flag for determining the starting or the suspension of the transmitting of data, relative to the slave transmission device. It is therefore possible to effectively control the transmitting of data by the slave transmission device, by means of the master transmission device.

BRIEF DESCRIPTION OF THE DRAWINGS

Other objects and features of the present invention will be apparent from the following description taken in connection with the accompanying drawings in which:

FIG. 2 is a block diagram showing a slave transmission device in a multipoint link data-transmission control system according to the embodiment of the present invention;

FIGS. 5A through 5H are timing charts relating to the transmitting of data by the slave transmission device, showing, respectively, an initial reset, bufferwrite pulse, transmission-request, internal-flag, transmission-timing clock, transmission-enable, transmission-complete, and transmission-output signals.

DETAILED DESCRIPTION OF THE PREFERRED EMBODIMENTS

Figure 1:
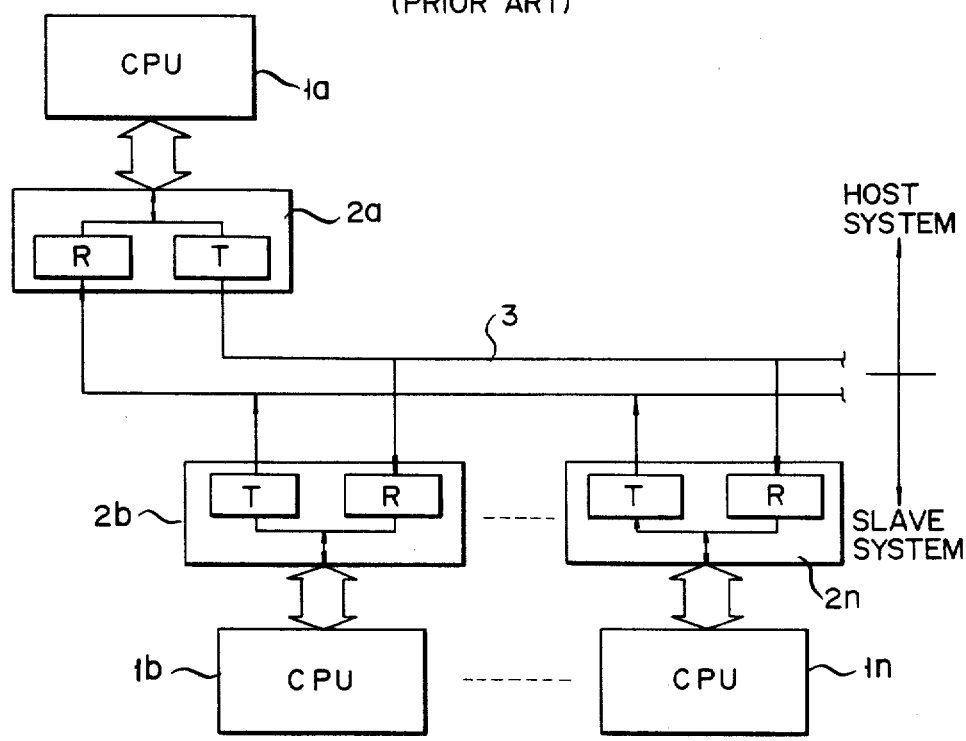
FIG. 1 is a block diagram schematically illustrating a general multipoint link data-transmission control system.

The embodiment of the present invention will now be explained below, with respect to FIGS. 2 through 5 in which like reference numerals are employed to designate like components or elements throughout the specification.

In this embodiment it should be understood that three types of transmission systems are employed, namely (1) a system for simultaneously transmitting message data from a master transmission device to all the slave transmission devices;

(2) a system for transmitting message data from a master transmission device to a respective slave device; and (3) a system for transmitting a message from a master transmission device to a slave transmission device, by designating the destination address thereof. In the case where a message is to be transmitted from a slave transmission device to a master transmission device, the master transmission device allocates a time slot to the respective slave transmission device, and receives data therefrom, or else allows one time slot to be shared among a plurality of slave transmission devices.

As is shown in FIG. 2, the slave transmission device is comprised of a receiving section A for receiving data transmitted via transmission path 3, transmission section B for transmitting data via transmission path 3, and interface section C for connecting receiving section A and transmission section B to their processor.

Receiving section A delivers data sent from the master transmission device via the transmission path, into a receiving buffer, as is set out below.

Figure 3:
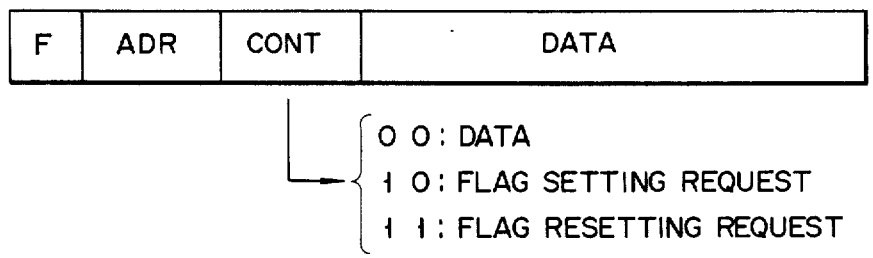
FIG. 3 shows a format of data as transmitted from a master transmission device to a slave transmission device.

The data sent from the master transmission device comprises, as is shown in FIG. 3, a flag (F) field representing the beginning of the data, an address (ADR) field representing a destination address, a control (CONT) field representing flag-setting and -resetting requests with respect to the slave transmission device, and a data field.

Receiving-control section 12 checks the destination address stored in receiving buffer 11, to see if it is directed to an intra-slave transmission device. If so, the data is loaded into receiving register 13 and command decoder 14. The data thus stored in receiving register 13 is delivered, via CPU interface 15 in interface section C, into a processor.

Command decoder 14 decodes the control field of the received data and, when data "00" is decoded, instructs receiving register 13 to supply the data which has been set therein, to processor 1b. Command decoder 14 sets flag register 16 when data "10" is decoded, and resets it when data "11" is decoded. Receiving section B comprises transmission buffer 17 for storing transmission data supplied from the processor via interface section C; transmission register 18 for receiving the transmission data stored in transmission buffer 17, in a predetermined timing, and for transmitting it onto the transmission path; transmission control section 19 for controlling the transmitting of data, and timing signal generator 20 for supplying a transmission clock signal to transmission register 18, and a transmission buffer-write pulse and transmission-timing clock signal to transmission control section 19.

Transmission control section 19 controls the transmitting of data in accordance with various transmission control signals supplied from the processor via CPU interface 15, and with the set state of flag register 16.

Figure 4:
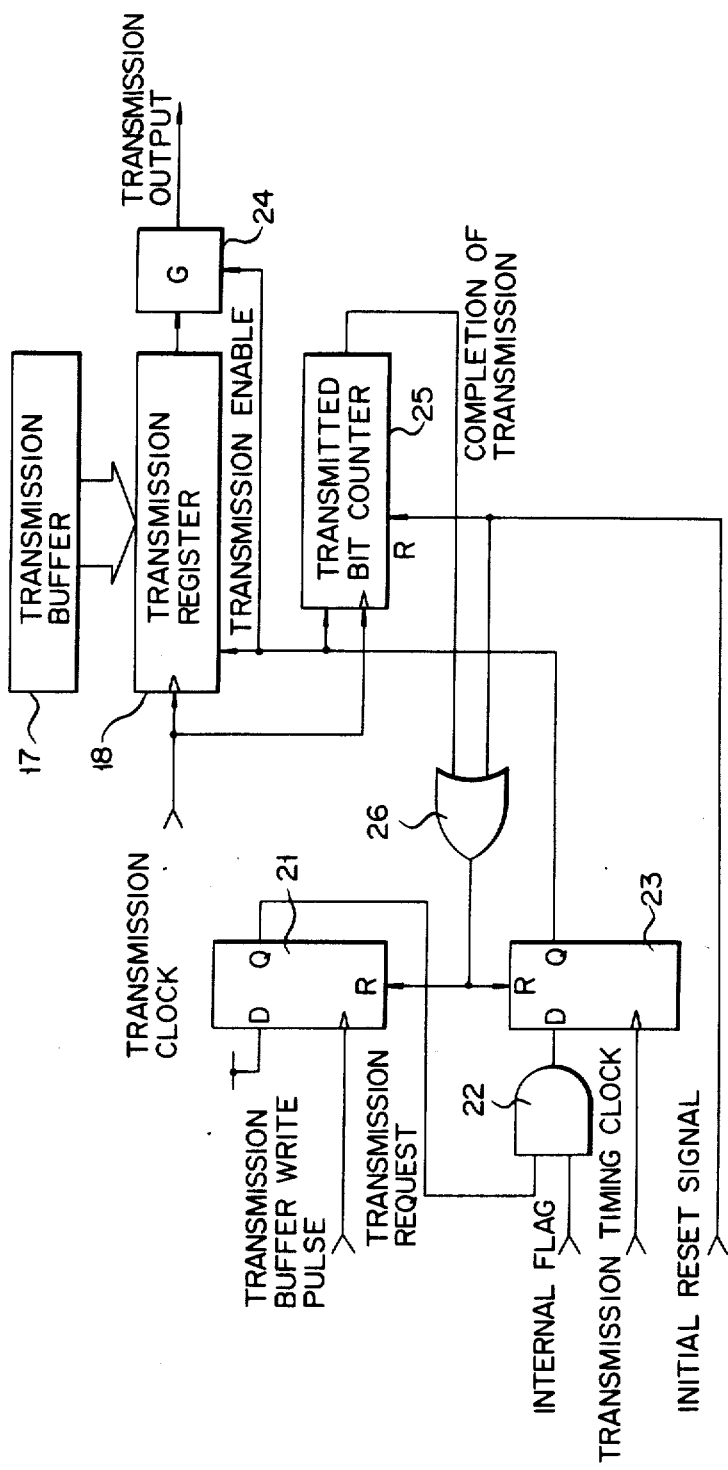
FIG. 4 is a circuit arrangement showing, in more detail, a transmission control section of the slave transmission device as shown-in FIG. 2.

FIG. 4 shows a circuit arrangement of transmission control section 19 in more detail. First flip-flop 21 is set upon receipt of a write pulse which is supplied when the transmission data is written onto transmission buffer 17. The "set" state of first flip-flop 21 indicates that the transmission data is stored in transmission buffer 17. The output signal of first flip-flop 21 is used as a transmission-request signal.

Upon receipt of the aforementioned transmission-request signal, gate circuit 22 supplies flag data, which has been held in flag register 16, to second flip-flop 23. In synchronization with the transmission-timing clock signal, as shown in FIG. 5E, flip-flop 23 supplies a transmission-enable signal to transmission register 18, output gate circuit 24 for the transmission path, and transmitted-bit number counter 25. As a result, transmission register 18 sequentially delivers the transmission data as an output signal, via output gate circuit 24, on the basis of the transmission clock signal supplied from timing signal generator 20. This clock signal is supplied to transmitted-bit number counter 25 where the transmitted clocks are counted. Bit number counter 25 delivers a "transmission-complete" output signal when all the data held in transmission register 18 have been delivered. The "transmission-complete" signal, together with the initial reset signal fed from the processor, is supplied via OR gate 26 to the reset terminals of first and second flip-flops 21 and 23, respectively.

The operation of the embodiment of the present invention will now be explained below.

Suppose that, with flag register 16 of FIG. 2 set, a transmission-request signal is being supplied from first flip-flop 21 to AND gate 22 (see FIG. 4). At this time, a high-level signal is supplied from AND gate 22 to second flip-flop 23, to set the latter. Flip-flop 23 supplies a transmission-enable signal to transmission register 18 and transmitted-bit number counter 25, noting that the data which has been held in transmission register 18 is supplied in accordance with the transmission clock, as indicated by a phase (I) in FIG. 5H.

Let it be assumed that, in this state, the aforementioned master transmission device supplies, to the slave transmission device, data containing flag-reset data which is written in the control field. As a result, flag register 16 is reset, transmitting the reset data to AND gate 22 at which time the transmitting of data continues, since AND gate 22 supplies the data from flag register 16 to second flip-flop 23, in synchronization with a transmission-timing clock. In this connection, phase (II) in FIG. 5H should be referred to.

After the transmission data of transmission register 18 have all been transmitted, flip-flops 21 and 23 are reset. As a result, since the flag data supplied from flag register 16 is reset at the time a transmission-request signal (as shown in FIG. 5C) is delivered as an output signal, no transmission-enable signal is delivered from flip-flop 23, and thus no data is transmitted from transmission register 18, as is indicated by a phase (III) in FIG. 5H.

As is set out above, with the multipoint link data transmission control system of the present invention, the flag of slave transmission device 2b is set or reset on the basis of control data supplied from master transmission device 2a, thus allowing or inhibiting the transmitting of data from slave transmission device 2b to master transmission device 2a, respectively.

When the flag is reset during the transmitting of data, the slave transmission device, upon the completion of this data transmission, inhibits further data transmission from taking place. The transmitting of data by the slave transmission device is inhibited where:

(1) it is desired to inhibit the transmitting of data by all the slave processors, while all the slave transmission devices (slave transmission control devices and slave processors) are operating normally; and (2) it is desired to inhibit the transmitting of data by a faulty slave transmission device.

It does not matter even if the transmitting of data by the faulty slave transmission device is inhibited during the data-transmission process, since this will not affect the transmitting of data by the other normally-operating slave transmission devices. Suppose that, with all the slave transmission devices in the normal operating state, the transmitting of data from the master transmission device to all the slave transmission mission devices is to be inhibited by "broadcasting", as in case (1). If this data transmission process is inhibited when any of the slave transmission devices is transmitting data, then that data will become ineffective. According to the present invention, however, such an inconvenience is inhibited by inhibiting the further transfer of such data after the current data transmission process has been completed.

Various changes and modifications can be made without departing from the spirit and scope of the invention. For example, the master transmission device may be a dual type.

What is claimed is:

1. A multipoint link data-transmission control system having a master transmission device to which a master processor is connected, and a slave transmission device connected via a synchronous bus to said master transmission device, to which a plurality of slave processors are connected, said slave processors transmitting message data to said master transmission device, said slave transmission device comprising:

a receiving section comprising decoding means for decoding message data transmitted from said master transmission device via said synchronous bus; said receiving section further comprising;

flag means for indicating whether said slave transmission device transmits or not to said master transmission device, in accordance with a decoded output from said decoding means, said flag means connected to said synchronous bus;

a transmission section comprising transmission data storage means for storing a message data to be transmitted to said master transmission device; said transmission section further comprising, transmitting means for transmitting the message data stored in said transmission data storage means, transmission control means for transmitting message data from said transmission data storage means to said transmitting means in accordance with flag data representing the resetting of said flag means during the transmission of the message data from said transmission data storage means, and said transmission control means stopping operation of said transmitting means after detecting that the message data has been sent from said transmission data storage means, said transmission control means being connected to said flag means; and, said plurality of slave processors transmit the message data from said transmission data storage means to said master transmission device in accordance with a corresponding time slot assigned to each of said plurality of slave processors.

2. The system according to claim 1, wherein:

said master transmission device has means for inhibiting said slave transmission device so that faulty message data is not transmitted to said master transmission device.

3. The system according to claim 1, wherein:

said master transmission device has means for designating the same message data to all the salve transmission devices of said plurality of slave processors which are operating normally.

4. The system according to claim 1, wherein:

said master transmission device has means for designating a particular message data and for sending a data transmission-disable flag to said transmission control means so that said master transmission device can inhibit a group of slave transmission devices of the same processing function from transmitting their message data to the master transmission device.

5. The system according to claim 1, wherein:

with the same time slot assigned to said plurality of slave processors, said slave transmission device having a means for delivering delivers to the master transmission device the message data with said slave transmission device's own corresponding identification code attached thereto.

6. A system according to claim 1, wherein:

the message data transmitted from the master transmission device contains control information.

* * * * *